United States Patent
Wise et al.

(10) Patent No.: US 11,872,968 B2
(45) Date of Patent: Jan. 16, 2024

(54) VALVE WITH FRANGIBLE FITTING

(71) Applicant: Bendix Commercial Vehicle Systems LLC, Elyria, OH (US)

(72) Inventors: Randy S Wise, Wellington, OH (US); Dennis A Wolf, Westlake, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 833 days.

(21) Appl. No.: 16/925,913

(22) Filed: Jul. 10, 2020

(65) Prior Publication Data

US 2022/0009465 A1  Jan. 13, 2022

(51) Int. Cl.
*B60T 15/02* (2006.01)
*B60T 17/04* (2006.01)

(52) U.S. Cl.
CPC .............. *B60T 15/02* (2013.01); *B60T 17/04* (2013.01); *B60Y 2200/10* (2013.01); *B60Y 2400/81* (2013.01); *Y10T 137/1654* (2015.04); *Y10T 137/2544* (2015.04)

(58) Field of Classification Search
CPC ......... Y10T 137/1654; Y10T 137/2544; B60T 15/02; B60T 15/024; B60T 15/027; B60T 15/38; B60T 15/48; B60T 15/50; B60T 15/52; B60T 15/56; B60T 17/04; B60T 17/046; B60T 17/06; B60T 17/221; B60Y 2200/10; B60Y 2400/81
See application file for complete search history.

(56) References Cited

U.S. PATENT DOCUMENTS

| | | | |
|---|---|---|---|
| 2,816,563 A * | 12/1957 | Pappas | B60T 15/52 137/512.2 |
| 3,861,754 A * | 1/1975 | Kruke | B60T 13/263 303/13 |
| 4,002,374 A * | 1/1977 | Horowitz | B60T 15/18 303/29 |
| 4,022,497 A | 5/1977 | Kotsakis | |
| 4,090,524 A | 5/1978 | Allread et al. | |
| 4,872,471 A | 10/1989 | Schneider | |
| 6,802,332 B1 | 10/2004 | Stuart | |
| 7,975,715 B2 * | 7/2011 | Ramler | B60T 15/203 303/64 |
| 2008/0142092 A1 | 6/2008 | Bai | |
| 2016/0334025 A1 | 11/2016 | Roth | |

OTHER PUBLICATIONS

Bendix Commercial Vehicle Systems LLC, "Bendix SRC-7000 Trailer Spring Brake Valve," Service Data Sheet SD-03-4656, Aug. 2010, 6 pages, Bendix Commercial Vehicle Systems LLC, Elyria Ohio, U.S.A.
European Patent Office, "International Search Report and Written Opinion," Report, dated Oct. 8, 2021, European Patent Office, Rijswijk Netherlands.

* cited by examiner

*Primary Examiner* — Matthew W Jellett
(74) *Attorney, Agent, or Firm* — Cheryl L. Greenly; Brian E. Kondas

(57) ABSTRACT

A valve for an air brake system on a commercial vehicle comprises a body, an inlet port connected to the body and at least one delivery port connected to the body. The inlet port has a threaded portion distal to the body and a hex portion proximate to the body. The hex portion includes a frangible feature in substantially the mid-point of the hex portion such that the valve can easily be removed from an air brake reservoir when the valve is broken at the frangible feature.

9 Claims, 3 Drawing Sheets

VALVE WITH FRANGIBLE FITTING

BACKGROUND

The present application relates to an air brake valve with a frangible fitting.

Air brake valves are used in commercial vehicle air brake systems. The valves may be mounted in various locations throughout the underside of the vehicle. Each valve works in the service brake or park brake system and responds to a control air signal. Some locations on the vehicle are more subject to damage due to debris impact while the vehicle is traveling or are mounted in locations with high vibration profiles. Valves that are damaged require removal from the vehicle and replacement. In extreme instances, the valve may be completely separated from its installation location on the vehicle. Ease of replacement of the valve is a necessity. Accordingly, those skilled in the art continue with research and development efforts in the field of valve designs to improve replacement of valves due to damage or failure.

SUMMARY

In accordance with one embodiment, a valve for an air brake system on a commercial vehicle comprises a body, an inlet port connected to the body, and at least one delivery port connected to the body. The inlet port has a threaded portion, a hex portion and a frangible feature in substantially the mid-point of the hex portion.

In accordance with another embodiment, an assembly for an air brake system for a commercial vehicle comprises a reservoir having a receiving port and a valve for attachment to the reservoir. The valve comprises a body, an inlet port connected to the body, and at least one delivery port connected to the body. The inlet port has a threaded portion, a hex portion and a frangible feature in substantially the mid-point of the hex portion.

DETAILED DESCRIPTION

Figure 1:
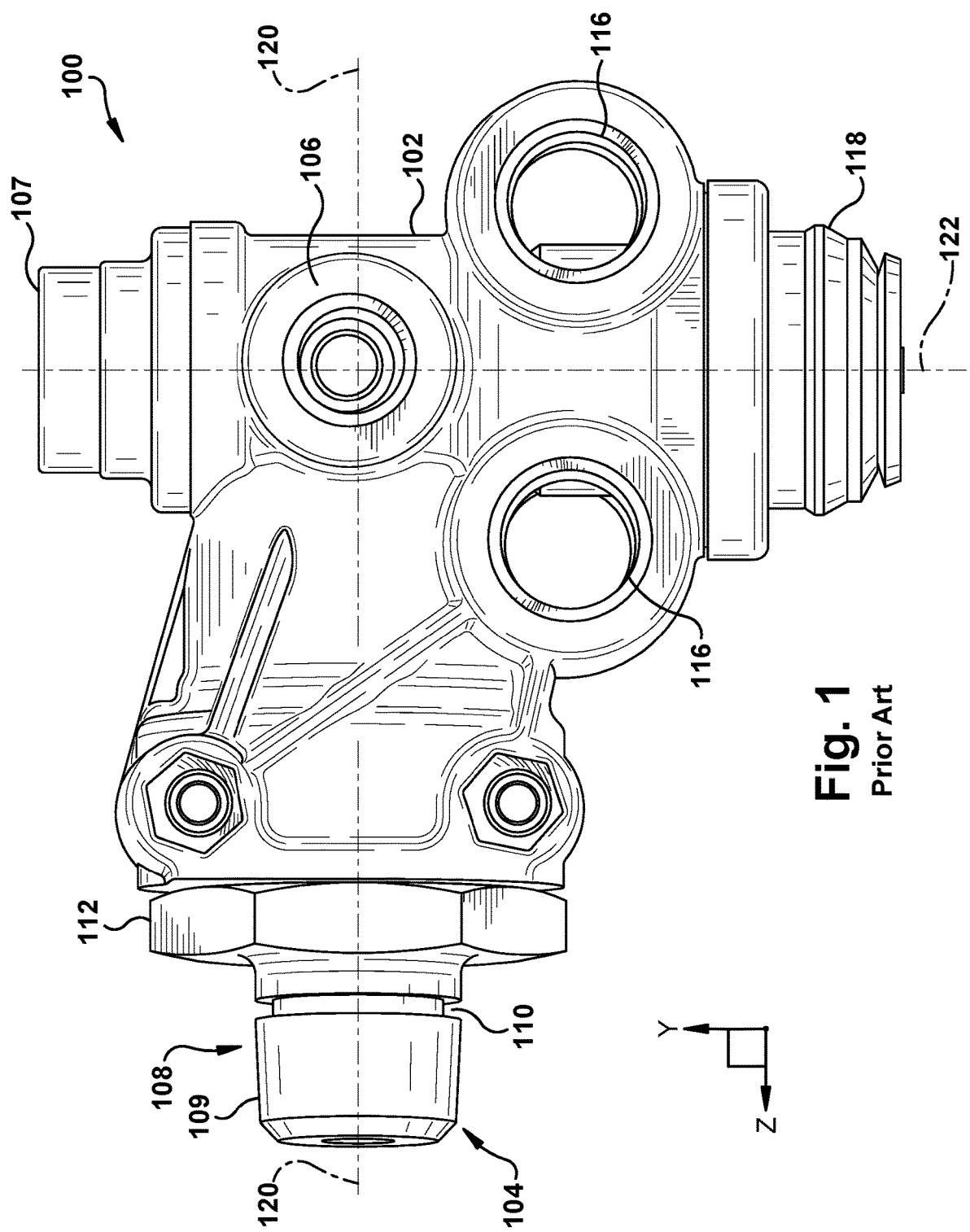
FIG. 1 is a representation of a prior art valve.

Referring to FIG. 1, a prior art valve 100 is illustrated. The prior art valve may be an SRC7000™ trailer spring brake valve manufactured by Bendix Commercial Vehicle Systems LLC of Elyria, Ohio. The valve 100 is capable of being mounted to an air brake reservoir on a commercial vehicle. The valve 100 is configured, under certain conditions, to apply trailer spring brakes, protect trailer reservoir air pressure and provide anti-compounding between service brakes and parking brakes.

Valve 100 has a body 102. The body 102 may be of metal or plastic material. The body 102 includes an inlet port 104, a supply port 106, a service port 107, delivery ports 116 and an exhaust port 118.

An axis 120 of the inlet port 104 is perpendicular to an axis 122 of the supply port 106 and exhaust port 118.

The inlet port 104 is configured with an inlet fitting 108 having a threaded portion 109 used in threading valve 100 into the air brake reservoir. This attachment to the air brake reservoir serves as the mounting location for the valve 100. Air is received into the valve 100 from the air brake reservoir through the inlet port 104. The inlet fitting 108 has a hex portion 112. The hex portion 112 has a larger diameter than the threaded portion 109 and is proximate to the body 102. The width of the hex portion 112 is less than the width of the threaded portion 109. The large diameter hex portion 112 requires special tools when used to rotate the valve 100 into the air brake reservoir. The hex portion 112 location makes it difficult to install valve 100 tight to the reservoir. The inlet fitting 108 may include an undercut 110 adjacent to the threaded portion 109.

This prior art valve 100 may be forcibly removed from the air brake reservoir upon impact to the valve 100. The undercut 110 is a weakened portion of the inlet fitting 108 where a breakaway may occur. The threaded portion 109 remains in the air brake reservoir after a substantial impact. The threaded portion 109 must be removed before a new valve can be installed. However, the threaded portion 109 cannot be easily removed from the air brake reservoir since the likely irregularly broken undercut is proximate to the reservoir. In some instances, the entire air brake reservoir must be replaced due to the threaded portion remaining in the air brake reservoir.

Figure 2:
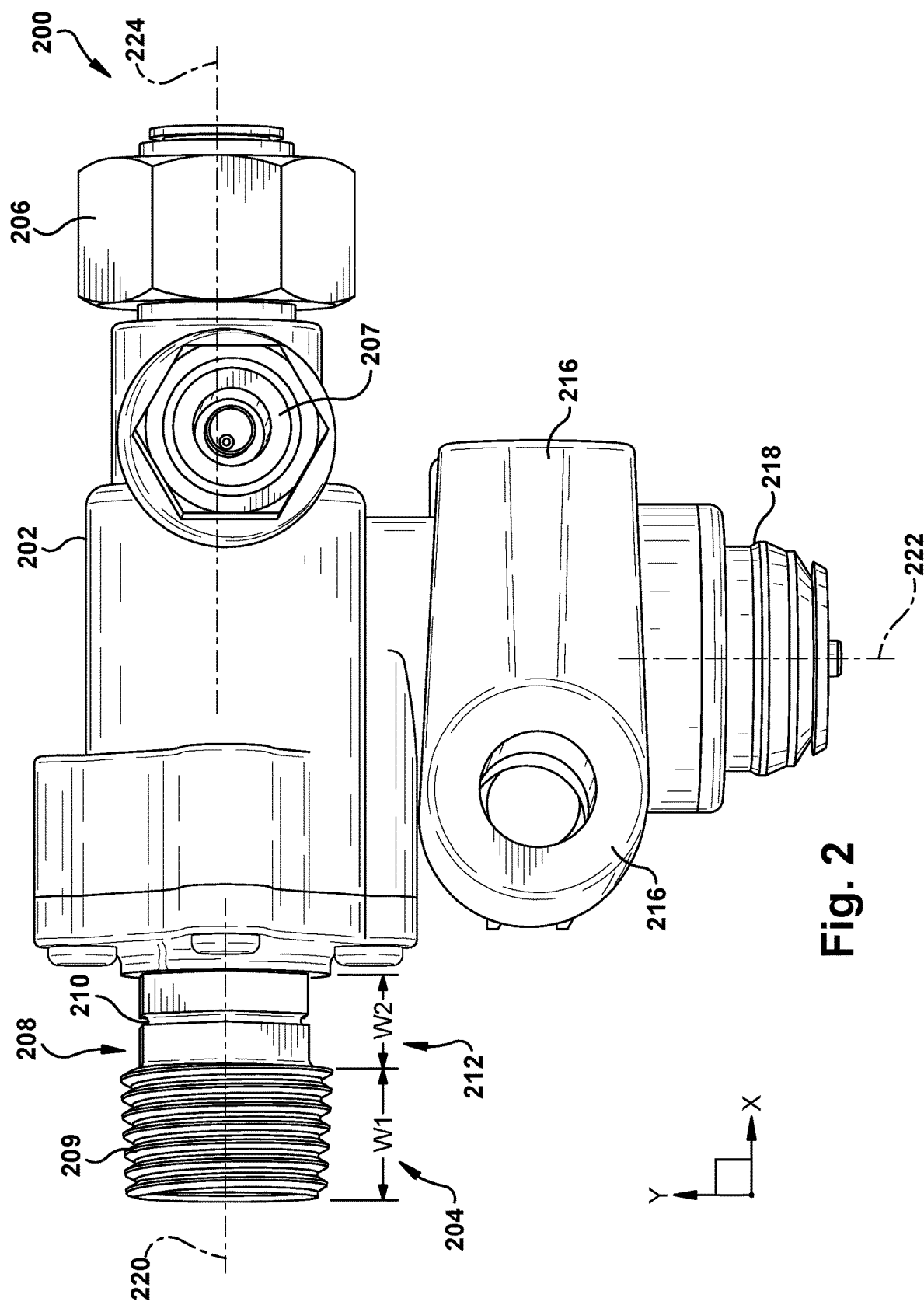
FIG. 2 is a representation of the present inventive valve depicting the frangible feature.

FIG. 2 shows inventive valve 200. The valve 200 operates as part of an air brake system for a vehicle including performing at least one of a quick release and a spring brake release function. While valve 200 is intended to be mounted in the same location on an air brake reservoir, it does have not have the same limitations as valve 100, as will be described.

Valve 200 has body 202. The body 202 may be of metal or plastic material. The body 202 includes an inlet port 204, a supply port 206, a service port 207, delivery ports 216 and an exhaust port 218.

An axis 220 through the inlet port 204 is perpendicular to an axis 222 through the exhaust port 218. Supply port 206 is on axis 224 (shown in FIG. 3), which is parallel to axis 220.

The inlet port 204 is configured with an inlet fitting 208. The inlet fitting 208 may be secured to the body 202 via screws, bolts or other means. The inlet port 204 may be integral with the body 202 or separable from the body 202. If separable from the body 202, the inlet fitting 208 may be the same material as body 202 or may be a different material. In one example, the body 202 is a plastic material and the inlet fitting 208 is aluminum. In another example, the inlet fitting 208 is brass.

The inlet fitting 208 has a threaded portion 209 used in threading valve 200 into an air brake reservoir. The threaded portion 209 may be threaded on both the interior and exterior of the threaded portion 209 to facilitate multiple different methods of attaching to the air brake reservoir.

The inlet fitting 208 has a hex portion 212. The width W2 of the hex portion 212 is approximately the same as the width W1 of the threaded portion 209. In one example, the width W2 is about 0.5 inches. The hex portion 212 has a smaller diameter than the threaded portion 209 and is proximate to the body 202. In one embodiment, the hex portion 212 has a distance across the flats of the hex portion, or of the diameter of an inscribed circle, of about 0.75 inches. The hex portion 212 receives a standard size tool for rotatably installing the valve 200 to the air brake reservoir.

The hex portion 212 includes a frangible feature 210 approximately in the mid-point of the width W2 of the hex portion 212. The frangible fuse 210 serves as a location where, upon substantial impact to the valve 220 or in response to extreme vibration, the inlet fitting 208 will break in two pieces. The width of the flats of the hex portion 212 is about 0.25 inches after breaking at the frangible feature 210, which will accommodate a standard wrench width. By breaking in approximately the middle of the hex portion 212, each of the broken piece and the remaining portion of the valve 200 will have a hex portion capable of receiving a tool.

Therefore, a valve for an air brake system on a commercial vehicle comprises a body, an inlet port connected to the body, and at least one delivery port connected to the body. The inlet port has a threaded portion distal to the body and a hex portion proximate to the body. The hex portion includes a frangible feature in substantially the mid-point of the hex portion.

Figure 3:
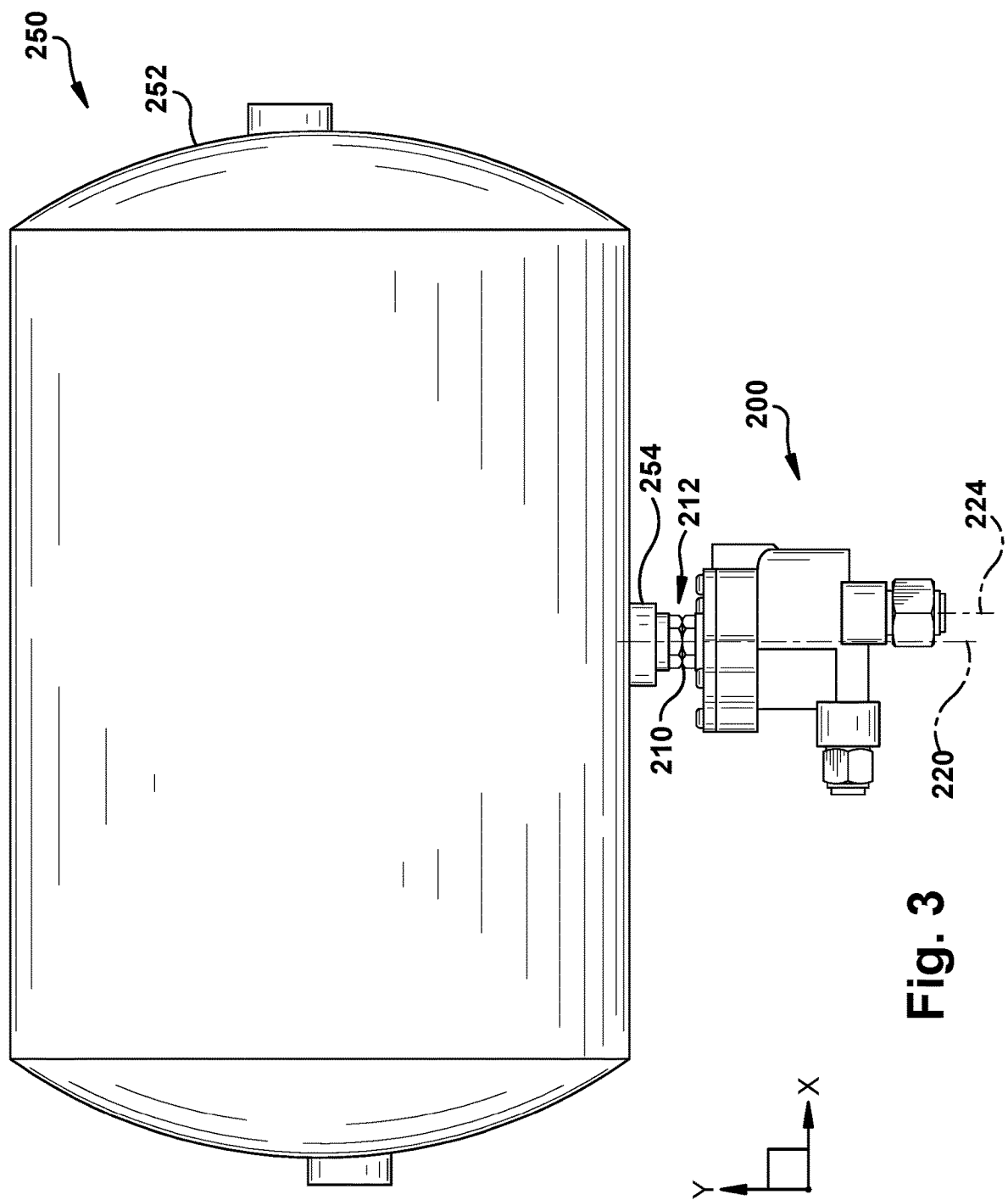
FIG. 3 is a representation of the present inventive valve as installed on an air reservoir.

FIG. 3 shows the air brake assembly 250. The air brake assembly 250 includes air brake reservoir 252 and valve 200. Valve 200 is shown as threadably installed in a receiving port 254 of air brake reservoir 252. The receiving port may be a nipple mount or a bung. The threaded portion 209 of valve 200 may have an interior thread of about 0.25 inches for nipple mounting or may be threaded into a bung of the air brake reservoir as shown in FIG. 3. The hex portion 212 is external to the receiving port 254 after installation.

The attachment of the threaded portion 209 to the air brake reservoir serves as the mounting location for the valve 200 on a vehicle. Air is received from the air brake reservoir through the inlet port 204. Additional air fittings and hoses (not shown) are installed to the delivery ports 216 and supply port 206 after installation of the valve 200 to the air brake reservoir 252.

Axis 220 of the inlet port 204 and axis 224 of the supply port 206 are shown as parallel to each other. The configuration of the valve 200 in this manner promotes ease in assembling the valve 200 to the air brake reservoir 252 and connecting the valve 200 to the rest of the air brake system while maintaining a center of gravity approximately at the midpoint of the intersection of the axes 220 and 222.

Upon breakage at the frangible feature 210, the broken inlet fitting 208 can be easily removed from the air brake reservoir 252 using the remaining hex portion. A new valve can then be installed on the receiving without any modification to the air brake reservoir 252. The hexagonal feature of the valve 200 is sized to promote removal by standard tools available in any maintenance toolset. For example, after the breakage at the frangible feature 210, a socket wrench can be used to remove the remaining portion of the inlet fitting 204 from the reservoir. The hex portion 212 also serves as a fail safe to prevent over torqueing of the fitting 208 when being installed.

While the present invention performs the functions of a trailer spring brake valve, other valves intended for mounting on an air brake reservoir, such as quick release valves, can benefit by have an inlet port designed with a frangible feature, such as fitting 208.

An assembly for an air brake system for a commercial vehicle comprises a reservoir having a receiving port and a valve for attachment to the reservoir. The valve comprises a body, an inlet port connected to the body, and at least one delivery port connected to the body. The inlet port has a threaded portion for mating with the receiving portion and a hex portion. The hex portion includes a frangible feature in substantially the mid-point of the hex portion.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A valve comprising:
    a body;
    an inlet port separable from the body, the inlet port having a threaded portion distal to the body and a hex portion proximate to the body, wherein the hex portion has a width of about 0.5 inches and includes a frangible feature in substantially the mid-point of the hex portion;
    at least one delivery port connected to the body;
    a supply port connected to the body having an axis parallel to an axis of the inlet port; and
    an exhaust port connected to the body having an axis perpendicular to both the supply port axis and the inlet port axis.

2. The valve as in claim 1, wherein the inlet port is a material different than the material of the body.

3. The valve as in claim 2, wherein the inlet port is a metal material and the body is a plastic material.

4. The valve as in claim 1, wherein the inlet port threaded portion includes internal threads and external threads.

5. The valve as in claim 1, wherein the threaded portion of the inlet port has a larger diameter than the hex portion.

6. The valve as in claim 5, wherein the hex portion has a distance across flats of the hex portion of about 0.75 inches.

7. An assembly comprising:
    a reservoir having a receiving port;
    a valve for attachment to the reservoir; the valve having a body;
    an inlet port connected to the body, the inlet port having a threaded portion for mating with the receiving port and a hex portion, wherein the hex portion has a width of about 0.5 inches and includes a frangible feature in substantially the mid-point of the hex portion wherein upon breakage at the frangible feature a first portion of the hex portion having a width of about 0.25 inches remains attached to the reservoir and a second portion of the hex portion having a width of about 0.25 inches remains connected to the body;
    at least one delivery port connected to the body;
    a supply port connected to the body having an axis parallel to an axis of the inlet port; and
    an exhaust port connected to the body having an axis perpendicular to both the supply port axis and the inlet port axis, wherein the inlet port axis is perpendicular to a surface of the reservoir when the valve is mated to the receiving port.

8. The assembly as in claim 7, wherein the hex portion of the valve does not extend into the receiving port of the reservoir when the valve is installed on the reservoir.

9. The assembly as in claim 7, wherein the reservoir receiving port is at least one of a nipple fitting and a bung fitting.

* * * * *